United States Patent
Vaschillo et al.

(10) Patent No.: US 7,426,519 B2
(45) Date of Patent: Sep. 16, 2008

(54) USING EXTENSIONS TO REPRESENT MULTITYPING

(75) Inventors: Alexander Vaschillo, Redmond, WA (US); Bryan T. Starbuck, Redmond, WA (US); Raghavendra Rachamadugu, Hi-Tech (IN); Bert Van Hoof, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 10/877,893

(22) Filed: Jun. 25, 2004

(65) Prior Publication Data

US 2005/0289157 A1    Dec. 29, 2005

(51) Int. Cl.
*G06F 7/00* (2006.01)
*G06F 17/00* (2006.01)

(52) U.S. Cl. ....................... 707/101; 707/102
(58) Field of Classification Search .......... 707/101–103
See application file for complete search history.

(56) References Cited

U.S. PATENT DOCUMENTS

2005/0050073 A1*  3/2005  Demiroski et al. .......... 707/100

OTHER PUBLICATIONS

Cattell et al., "The Object Data Standard: ODMG 3.0", Morgan Kaufmann, Mar. 2000, pp. 9-12.*

Feng, L., et al., "Schemata Transformation of Object-Oriented Conceptual Models to XML," *Computer Systems Science & Engineering* 18(1):45-60, 2003.

Joseph, M., "The UML for Data Modellers," *Elektron*, Apr. 2004, pp. 72-73.

Wang, G., and M. Liu, "Extending XML Schema With Nonmonotonic Inheritance," in M.A. Jeusfeld and Ó. Pastor (eds.), *ER 2003 Workshops, Lecture Notes in Computer Science* 2814:402-407, 2003.

* cited by examiner

*Primary Examiner*—Christian P. Chace
*Assistant Examiner*—Michael J Hicks
(74) *Attorney, Agent, or Firm*—Christensen O'Connor Johnson Kindness PLLC (57) ABSTRACT

A method and system are provided in which data may be multityped using a schematized data model. A standardized schema in a schematized data model includes at least one base construct for representing data that is common across multiple types of an object that the model represents. An extension to the standardized schema is at least one extension construct for representing data that is specific to a single type of the multiple types of the object. Instances of the extension construct are directly or indirectly associated with exactly one instance of the base construct without impacting the behavior and functionality of the base construct. Multiple extensions may be used to represent data that is specific to each of the corresponding multiple types of the object.

14 Claims, 6 Drawing Sheets

USING EXTENSIONS TO REPRESENT MULTITYPING

CROSS-REFERENCE TO RELATED APPLICATION

This application is related by subject matter to the inventions disclosed in the following commonly assigned co-pending applications: U.S. patent application Ser. No. 10/692,097, filed Oct. 23, 2003 and U.S. patent application Ser. No. 10/646,940, filed Aug. 21, 2003.

FIELD OF THE INVENTION

In general, the present invention relates to data storage systems and, in particular, to systems and methods for multityping data using a schematized data model.

BACKGROUND OF THE INVENTION

Data modeling can be defined as the analysis of data and the relationships between data. Data modeling has been used for a number of years to make intelligent decisions about how to organize and store data. In general, data modeling results in the creation of a data model comprising abstract data types that describe the data of interest and the relationships between the data. The abstract data types become the templates for describing actual objects of data used in an application.

In recent years, data modeling has taken on even greater importance as the use and capacity of electronic media to store text, music, pictures, and other types of data has dramatically increased. Conventional file systems, such as those based on a file allocation table, or FAT file system, impose constraints on the organization and storage of data that are often at odds with data modeling analysis and result in less than optimal data organization and storage. For example, most conventional file systems require files to be maintained in a hierarchical directory tree. Besides being location dependent, a hierarchical organization may not be the most advantageous way to access the files from the user's point of view. Moreover, the data may not be file-based at all, but rather non-file data, such as personal contacts, event calendars, electronic mail, and facsimile transmissions.

Recent improvements in data storage systems have allowed greater flexibility in organizing data to facilitate monitoring, managing and manipulating data. For example, in the Windows® operating system, the WinFS data storage subsystem is based on a schematized data model that allows users to organize information independent of how the information is stored physically. The data storage subsystem includes a base schema created with the various constructs provided by WinFS. Users may extend the base schema or add new schemas to suit their needs.

Although WinFS eliminates many of the constraints imposed by conventional file systems, some limitations remain. For example, the schematized data model upon which the WinFS data storage subsystem is based supports single inheritance but not multiple inheritance. Inheritance is a particular type of relationship between two different abstract data types where one abstract data type inherits the characteristics of another abstract data type, sometimes described as an inheritance hierarchy. As an example, rather than redefine primate characteristics for each abstract data type describing a monkey, an ape, and a human, those characteristics could be defined once in an abstract data type describing a primate, referred to as a super type, and inherited in the other abstract data types, referred to as sub types. Single inheritance is when an abstract data type can inherit characteristics from just one super type, whereas multiple inheritance is when an abstract data type inherits characteristics from more than one super type.

In general, inheritance is one of the most useful concepts employed in data modeling because it eliminates redundancies in data and promotes greater consistency in the overall structure of the data and the applications that use the data. Multiple inheritance can be very useful in describing real-world data that can be classified in many different ways, e.g., messages classified by how they were transported, to whom they were sent, and with what application they were viewed, often referred to as multityping. Though useful, there are a number of reasons why data models choose not to support multiple inheritance, the most pertinent being increased data storage requirements as well as increased complexity and ambiguity in the data model. Alternatives to multiple inheritance include strong typing, by defining separate abstract data types for each type of object, e.g., separate abstract data types for email and fax messages. Strong typing has the disadvantage of only allowing the definition of properties specific to the particular abstract data type. Another alternative is weak typing, in which abstract data types are grouped into a category, e.g., an abstract data type for a message object grouped into an email category or a fax category, depending on whether the message object is an email or a fax. But weak typing, too, has a disadvantage, in this case the disadvantage of not allowing the definition of category-specific properties in the abstract data type, e.g., not allowing the definition of fax properties in the abstract data type for a message.

Consequently, other techniques must be developed for describing data that requires multityping using a data storage subsystem having a single inheritance hierarchy in a manner that makes efficient use of data storage capacity and does not introduce undesirable complexity and ambiguity.

SUMMARY OF THE INVENTION

To overcome the above-described problems, a system, method, and computer-accessible medium for multityping data using a schematized data model are provided.

In accordance with one aspect of the present invention, the method employs an extension to a standardized schema to represent type-specific data. The standardized schema is any schematized data model that includes at least one base construct for representing data that is common across multiple types of an object that the model represents. The extension to the standardized schema is at least one extension construct for representing data that is specific to a single type of the multiple types of the object. The extension is associated with the base construct without impacting the base construct's behavior and functionality.

In accordance with another aspect of the present invention, multiple extensions may be used to represent data that is specific to each of the corresponding multiple types of the object that the model represents. In this manner, a base construct may be declared as belonging to more than one type of the object. Again, the extensions are associated with the base construct without impacting the base construct's behavior and functionality.

In accordance with yet other aspects of the present invention, a computer-accessible medium for multityping data using a schematized data model is provided. The computer-accessible medium comprises data and computer-executable components to create and manage extensions to a standardized schema to represent multityped data. The data includes the base constructs comprising the standardized schema as well as the extensions that define the multityped data. The computer-executable components are capable of performing actions on the data that are generally consistent with the above-described method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following discussion is intended to provide a brief, general description of a computing system suitable for implementing various features of the invention. While the computing system will be described in the general context of a personal computer usable in a distributed computing environment, where complementary tasks are performed by remote computing devices linked together through a communication network, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices, including laptop computers, tablet computers, personal digital assistants (PDAs), and other devices upon which computer software or other digital content is installed. Those skilled in the art will also recognize that each of the suitable exemplary computing systems described above inherently include a processor and a computer-accessible storage medium.

While aspects of the invention may be described in terms of programs executed by applications in conjunction with a personal computer, those skilled in the art will recognize that those aspects also may be implemented in combination with other program modules. Generally, program modules include routines, programs, components, data structures, etc., which perform particular tasks or implement particular abstract data types.

Figure 1:
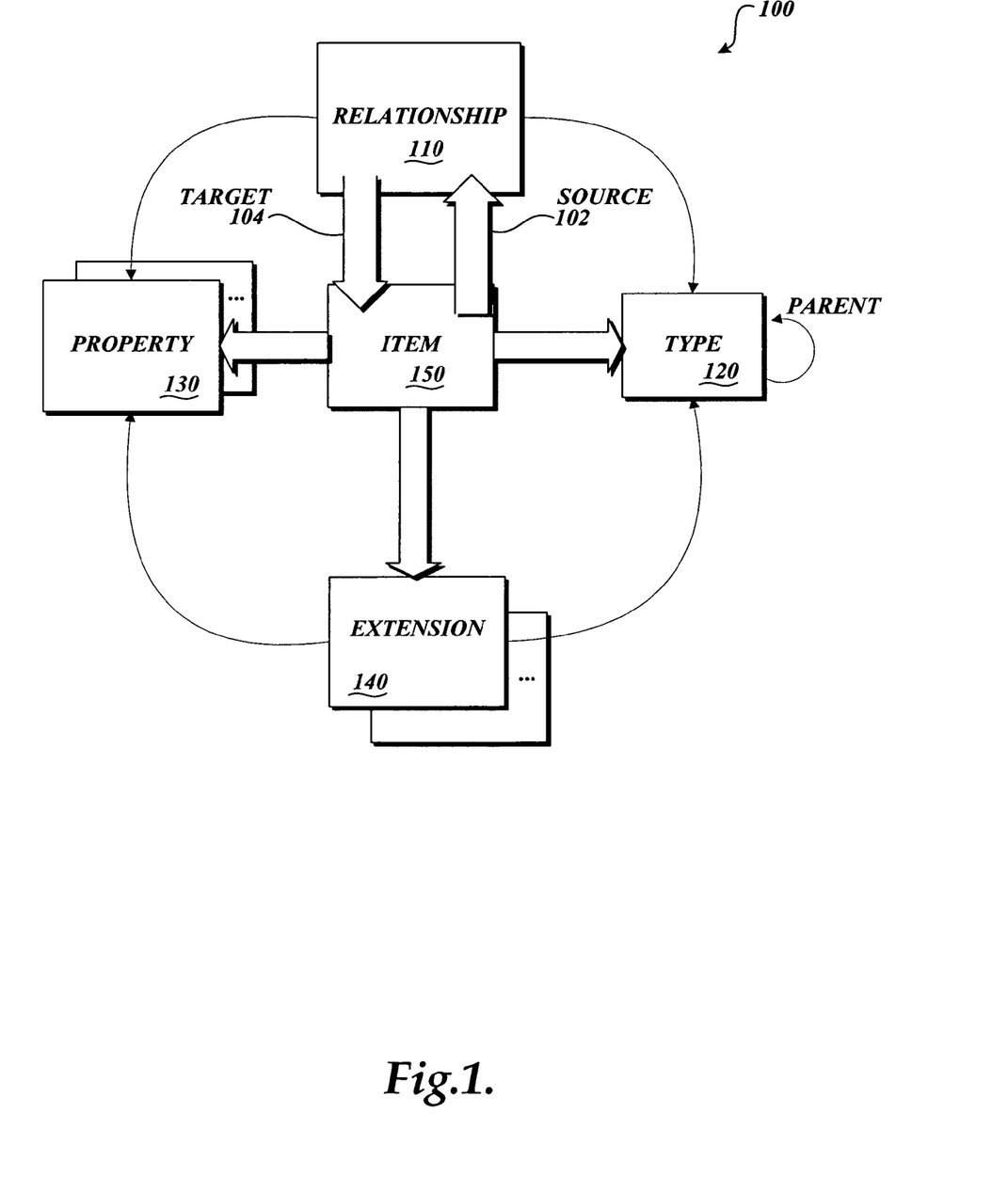
FIG. 1 depicts an overview of a conceptual storage model for representing multityped data using extensions to a standardized schema, formed in accordance with the present invention.

FIG. 1 is a depiction of an overview of a conceptual storage model 100 for representing multityped data using extensions to a standardized schema formed in accordance with the present invention. The standardized schema comprises a collection of constructs representing abstract data types. The constructs include, among others, items, properties, relationships, types, and extensions.

An item 150 is the primary container of data and describes an object that the abstract data type represents. Each item contains multiple properties 130 to hold the data, where a property is a field that can have one or more values.

A relationship 110 is an association between two items 150. Each relationship refers to two items 150 called a source 102 or a target 104, depending on the direction of the relationship 110. Source items 102 originate the relationship 110, and target items 104 receive the relationship 110.

A type 120 defines the structure of an item 150, relationship 110, or extension 140 by defining its properties 130. For example, each item has a reference to a type 120 that defines what properties the item has, essentially functioning as a template for an instance of an item 150. Since types 120 can be used with items, relationships, or extensions, they are commonly referred to as item types, relationship types, or extension types.

An extension 140 is similar to an item 150 in that it contains properties 130 defined by a type 120. But extensions 140 are always associated with exactly one item 150, i.e., an extension cannot be associated with more than one item. In addition, each extension 140 has a different type 120, i.e., each extension 140 is associated with a specific type 120. In some cases, the extension 140 is associated with exactly one item 150 in an indirect manner by being associated with another extension 140 that is already associated with exactly one item 150. The life of an extension 140 depends on the life of the item 150 with which the extension is associated, directly or indirectly. Thus, when the item 150 is deleted, so are all of its extensions 140. In one embodiment, the extension 140 may be implemented as described in commonly assigned co-pending U.S. patent application Ser. No. 10/692,097, filed Oct. 23, 2003.

In the standardized schema, an item type 120 defines the properties 130 that most or all of the objects that the item 150 describes have in common. Examples include a document item type having properties 130 for author and title, since many, if not all, document objects will have an author and a title, or a message item type having properties 130 for the sender and the recipient, since many, if not all, message objects will have a sender and a recipient.

In accordance with an embodiment of the present invention, the extension 140 is used to contain data that cannot be contained in the item 150 because the data describes properties 130 that are specific to the particular type of object being described, i.e., type-specific data, and not all objects that the item 150 describes have the type-specific data. Thus, using the above message example, an extension 140 is used to represent email-specific data that is associated with a message object but not contained in the item 150, since not all messages are emails. An example of email-specific data might be whether the email is a newly-created or draft email message as determined by the presence or absence of a value in the Message-ID field in the Simple Mail Transport Protocol (SMTP). Accordingly, the Message-ID field is stored in an email-specific data field in an email extension 140, e.g., the InternetMessageID data field.

Taken together, the item 150, extension 140, property 130, and type 120 are the base constructs upon which a standardized schema and extensions to such a schema are based.

Figure 2:
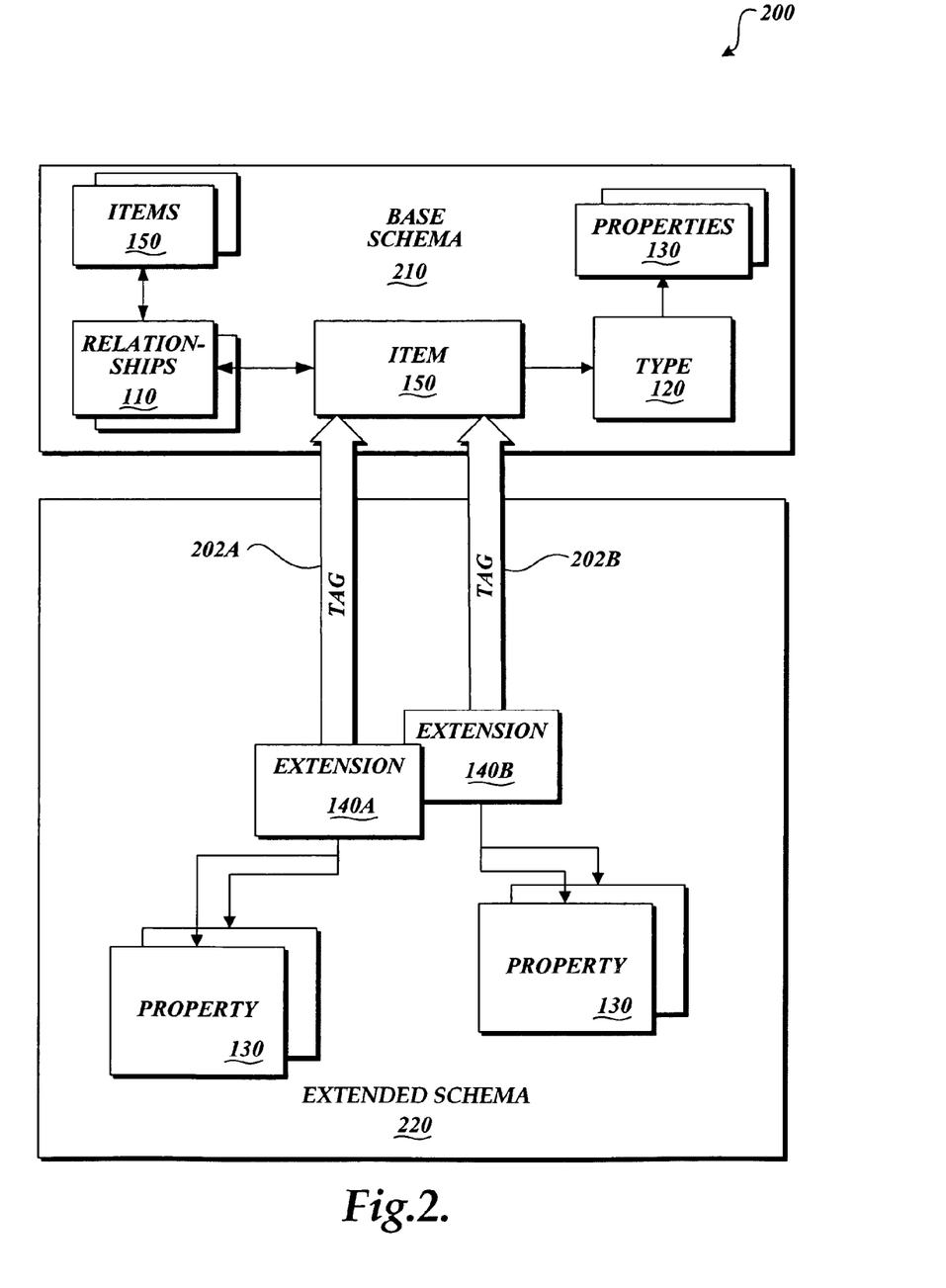
FIG. 2 depicts further aspects of the conceptual storage model for defining a base schema, and an extension to the base schema, formed in accordance with the present invention.

FIG. 2 is a depiction of further aspects of the conceptual storage model 200 for defining a base schema, and an extension to the base schema, formed in accordance with the present invention. Specifically, FIG. 2 depicts an exemplary base schema 210 comprising an item 150 having relationships with other items 150, and a type 120 that defines one or more properties 130 of the item 150. The exemplary base schema 210 may be previously defined, as defined in the Microsoft Windows operating system's Base Schema and the Core Schema, or as defined by a third party vendor, or as defined by a user. For example, in the Windows operating system, the Base Schema provided as part of the WinFS data storage subsystem defines user data, such as contacts, documents, messages, locations, tasks, etc. Similarly, the Windows Core Schema provided as part of the WinFS data storage subsystem defines system data, such as configuration data, data that applications use and share, system tasks, devices, security information, etc. In a preferred embodiment, the base schema 210 is any schematized data model that provides at least one item 150 containing properties 130 defined in a type 120 to hold data that objects described by the item 150 have in common. Although not required, in one embodiment, the item 150 may further have one or more relationships 110 with other items 150 in the base schema data model 210.

Further depicted is an extended schema 220 comprising one or more extensions 140A, 140B, each extension containing one or more properties 130, as defined in a type 120 (not shown), to hold data that is specific to the type of object that the item 150 describes, i.e., that extend the description of the object. As illustrated, the extensions 140A, 140B, are logically attached to a particular one of the items 150 in the base schema 210, since the base schema 210 may contain items 150 for many different objects, e.g. document objects, message objects, task objects, etc. The logical attachment may be represented in any number of ways as long as the attachment does not affect or otherwise alter the behavior of the item 150 to which the extensions are attached. In one embodiment, the attachment of the extension 140A, 140B, to the item 150 is referred to as tagging the extension 140 to the item 150 using a tag 202A, 202B that attaches the extension to the item. It is understood that more or less than the two illustrated extensions 140A, 140B may be present in an extended schema 220 and attached to the item 150 without departing from the scope of the claims that follow. However, as a practical matter, the number of extensions 140 will be sufficient to accommodate however many types of an object that may be described using the extended schema 220.

Figure 3:
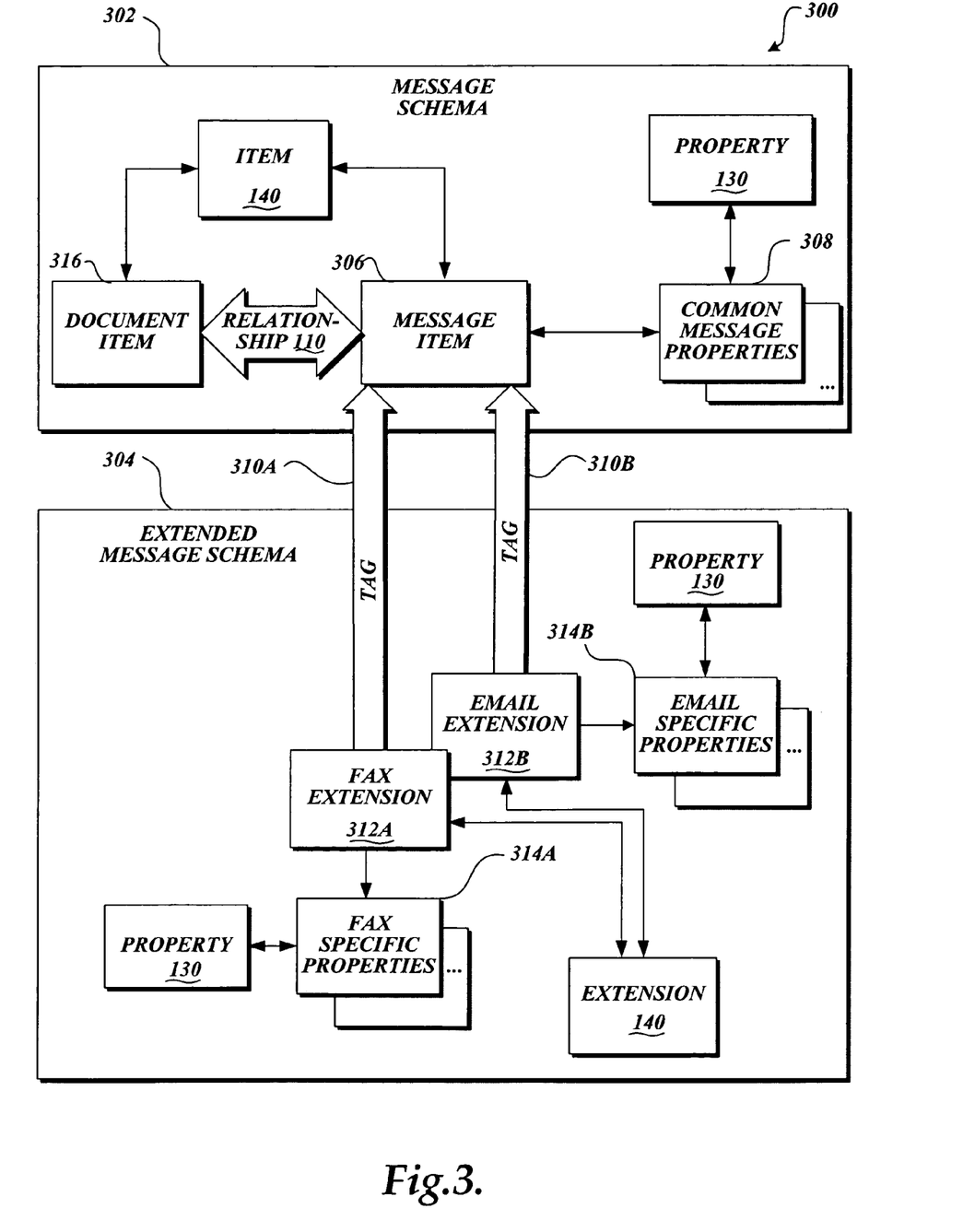
FIG. 3 depicts an overview of an exemplary base schema and an extended schema for represent multityped message data, formed in accordance with the present invention.

FIG. 3 depicts an overview of an exemplary base schema and an extended schema 300 for representing a unified messaging schema for multityped message data, formed in accordance with the present invention. As illustrated, a base message schema 302 includes a message item 306 based on the item 150 construct provided in the base schema 210. The message item 306 contains common data describing an object and held in one or more message properties 308 based on the property 130 construct provided in the base schema 210, and as defined by the message item's type 120 (not shown). Although not required, in one embodiment, the message item 306 may further have one or more relationships 110 with other items, such as the illustrated document item 316, also based on the item 150 construct provided in the base schema 210. For example, the message item 306 may contain certain common message data such as the name of the recipient and the sender, and may further have a relationship 110 with document item 316, which contains certain common document data that describe a document associated with the message, such as the text content or length of the body of the message, or an attachment to the message. In one embodiment, the base message schema 302 may be implemented as described in commonly assigned co-pending U.S. patent application Ser. No. 10/646,940, filed Aug. 21, 2003.

As further illustrated in FIG. 3, an extended message schema 304 includes at least one extension 312 based on the extension 140 construct provided in the base schema 210. Here, the extended message schema 304 is shown to include both a fax extension 312A and an email extension 312B. Each extension 312 defines one or more properties 314 that are specific to the type of object being described, and, like the common message properties 308, are based on the property 130 and type 120 (not shown) constructs provided in the base schema 210. For example, as illustrated, the fax extension 312A contains data that describes one or more fax-specific properties 314A of a message object, and the email extension 312B contains data that describes one or more email-specific properties 314B of a message object.

As further illustrated in FIG. 3, the fax extension 312A and email extension 312B are associated with a message item by being logically attached to the message item 306 in the base message schema 302. In one embodiment, the logical attachment is represented as one or more tags 310A, 310B that associate exactly one message item 306 to any number of extensions 312 present in the extended message schema 304. In one embodiment, the tags 310A, 310B may also associate one or more of the extensions 312 with other extensions 312, as long as the other extensions 312 are already associated with exactly one message item 306. The logical attachment may be expressed in any number of ways, as long as the attachment does not affect or otherwise alter the behavior and functionality of the message item 306 to which the extension is attached. For example, the base message schema 302 may implement a universal inbox, i.e., one inbox that tracks all types of messages, such as emails, faxes, instant messages, etc. The functionality for implementing the universal inbox for the message should remain unchanged, irrespective of the attached type-specific extensions, such as the email, fax, and instant message extensions, etc.

It is understood that other extensions 312 describing types of message objects other than the email and fax types illustrated in FIG. 3 may be present in an extended message schema 304 and attached to a message item 306 without departing from the scope of the claims that follow. However, it should be noted that only one instance of a particular kind of extension 312 may be attached to a instance of a message item 306, i.e. only one fax message extension 312A. only one email message extension 312B, and so forth. As a practical matter, the number of extensions 312 generated and attached to the message items 306 in this manner will be sufficient to accommodate however many different types of objects that the data model must support. Examples of other types of message data that an extension 312 may contain to describe different types of message objects are described in further detail below with reference to FIG. 4.

Figure 4:
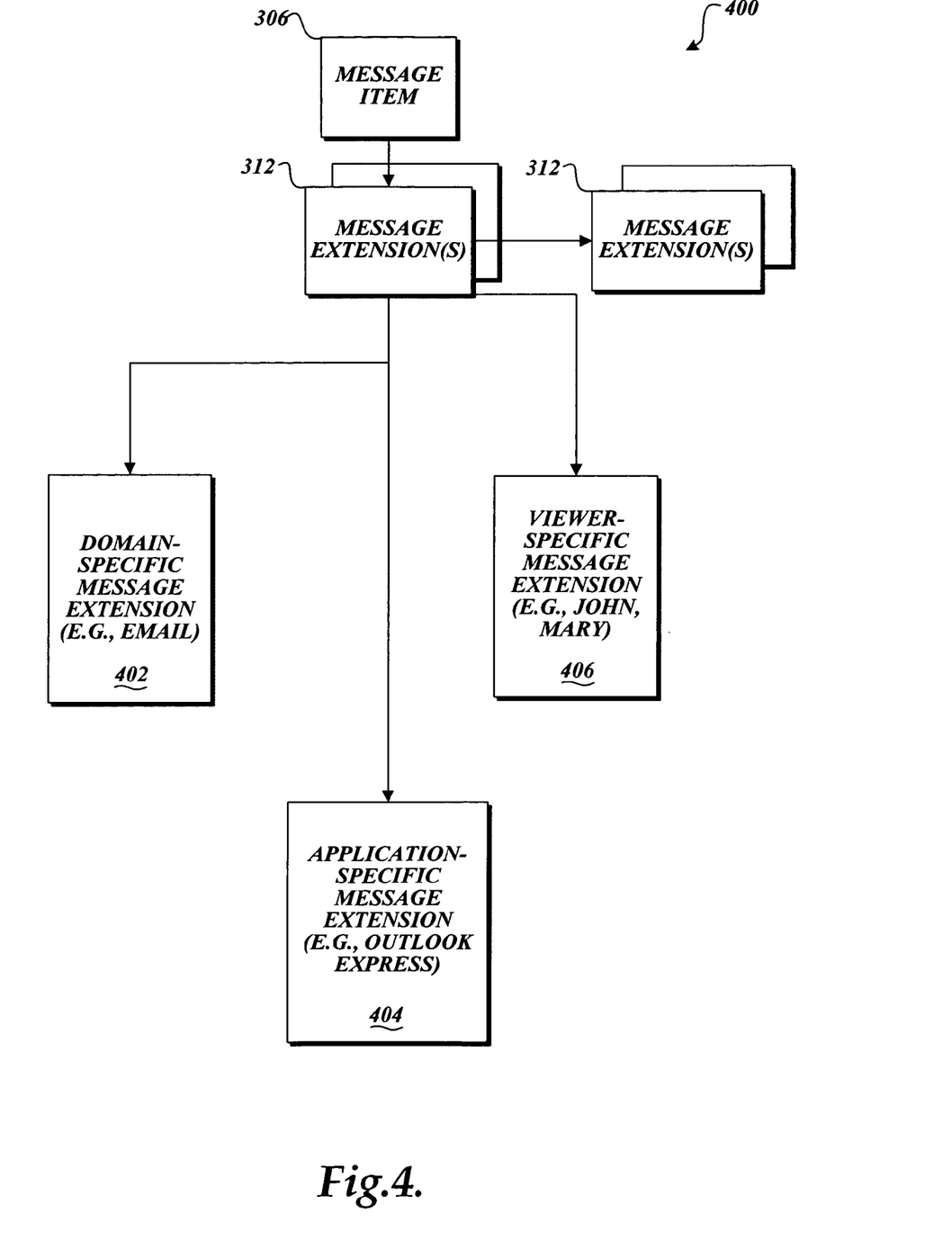
FIG. 4 depicts further aspects of the exemplary extended schema for representing multityped message data, formed in accordance with the present invention.

FIG. 4 depicts further aspects 400 of the exemplary extended message schema for representing multityped message data, formed in accordance with the present invention. As illustrated, a message item 306 is associated with at least one message extension 312. As described earlier, the extension contains data that is specific to the particular type of object being described, in this case data that is specific to a particular type of message. In the message schema example introduced in FIG. 2, the type-specific data thus far illustrated includes domain-specific message data, i.e., data having to do with messages in certain messaging domains, such as email, facsimile transmissions, voicemail, instant messaging, etc.

However the type-specific data that may be defined in an extension 140, 312 is not limited to domain-specific data. For example, in the context of messaging, the type-specific data may include application-specific data for a particular application used with messages, e.g., Microsoft's Outlook email application. As another example, also in the context of messaging, the type-specific data may include viewer-specific data for a particular user of messages, e.g., user "John," or "Mary."

As described in FIG. 4, the variations of type-specific data that may be defined in an extension are many, being largely driven by the real-world scenarios which the data is to support. For instance, continuing with the messaging example introduced in FIG. 2, when a user views a message, there should be an easy way to determine whether the message has been, or is intended to be, processed with the Microsoft Outlook, Outlook Express, or another application on the user's computer. By using extensions 140, 312 to contain certain types of application-specific data, the scenario may be supported with programmatic analysis of the extensions 140, 312 attached to the message object's message item 306 without altering the programmatic handling of the message item 306 in general. As another example, since a fax message may be forwarded as an email attachment to some recipients, and as a fax to other recipients (e.g., those without an email address), the message object can have both fax-specific properties and email-specific properties. Using extensions 140, 312 to contain the fax-specific and email-specific data advantageously simplifies the programmatic handling of such message objects since the behavior and contents of the message item 306 remains otherwise unaffected. Other examples of type-specific data that may be defined in a message extension are described in further detail in commonly assigned co-pending U.S. patent application Ser. No. 10/692,097, filed Oct. 23, 2003, which is herein incorporated by reference.

In certain real-world scenarios, it may be desirable to be able to further multitype data that is already type-specific, i.e., to subtype multityped data. In one embodiment, this may be achieved by indirectly associating an extension 140, 312, to an object's item 150, 306, by attaching the extension to another extension that has already been attached to the object's item. For example, as illustrated in FIG. 4, a first message extension 312 that is attached to a message item 306 may itself be attached to a second message extension 312 that describes data of a subtype of the type-specific data described in the first message extension. In this manner, the second message extension can inherit attributes of one or more other message extensions already attached to the object's item.

Figure 5:
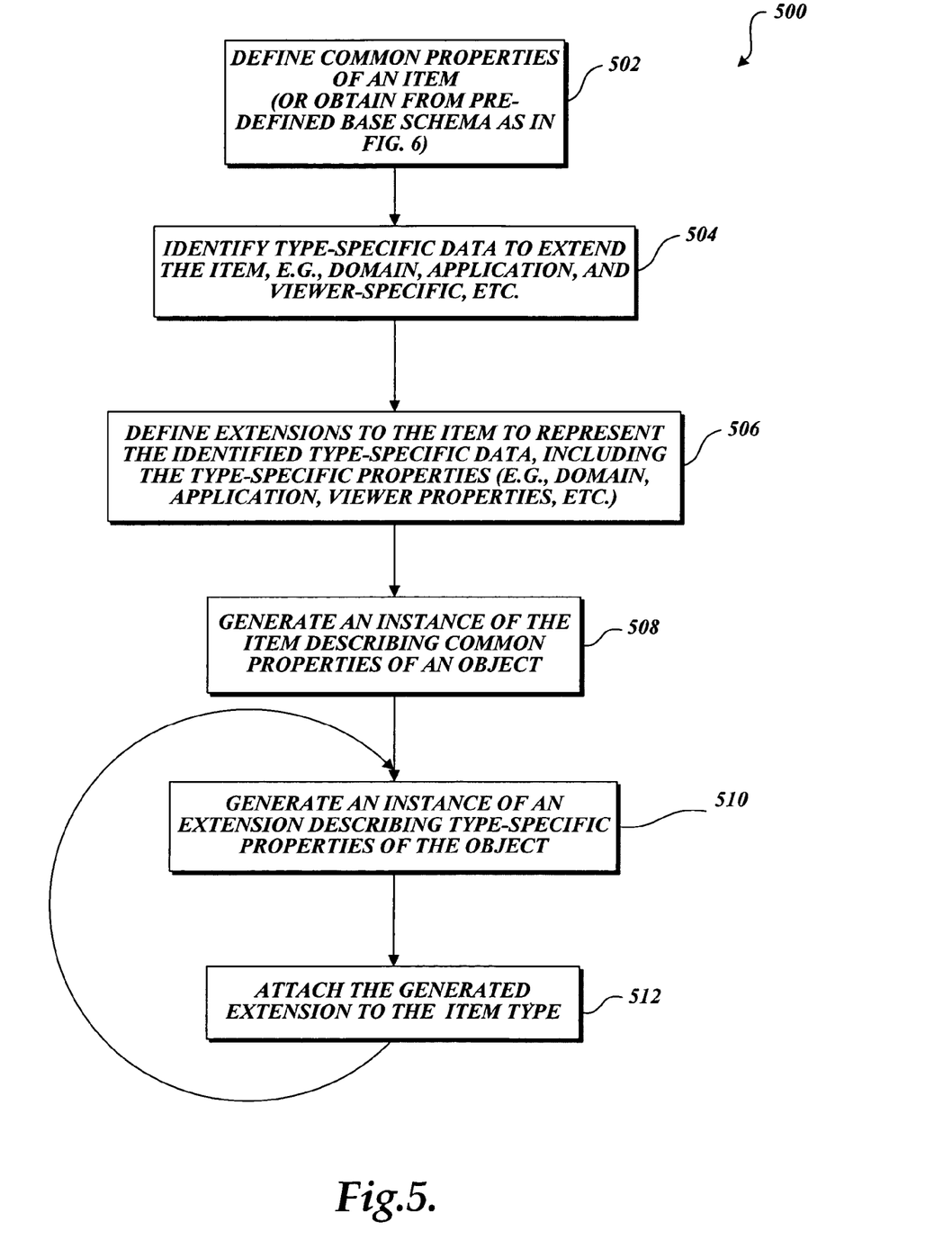
FIG. 5 is a flow diagram illustrating the logic performed by a general-purpose computer system for extending a schema to represent multityped data, formed in accordance with the present invention.

FIG. 5 is a flow diagram illustrating the logic 500 performed by a general-purpose computer system for extending a schema to represent multityped data, formed in accordance with the present invention. The logic 500 begins in processing block 502 with the identification of data that is common to most, if not all, types of an object, and defining properties 130 in an item's type 120 to hold the common data in the item 150 as part of a schematized data model, such as the model employed in the Windows WinFS data storage subsystem. To extend the description of the object to include data that describes the specific types of the object that are likely to occur in a typical real-world scenario, the user continues at process block 504 to identify which type-specific data to include in an extension 140. In general, the type-specific data may be identified by performing a data modeling analysis of the domains, applications, and users with which the object that the item 150 describes is or will be associated. Once the analysis is complete, at process block 506, the user creates one or more extensions 140 to contain the type-specific data identified in process block 504. As noted, in general, the type-specific data may include data that is specific to a particular domain, application, or user/viewer with which the object is associated.

After obtaining and/or creating the abstract data types for the item 150 and extensions 140 that describe an object, processing continues at process block 508, where an instance of an item 150 is generated to contain the data that describes an actual object. For example, a document item may be generated whenever a user creates a new document object, where the document item contains data that describes the author and title properties of the document, since the author and title properties are common to all, or nearly all, document objects. Processing continues at processing block 510, where instances of one or more extensions 140 are generated to contain data that describe the type-specific properties of the object. Using the document example, an instance of a document extension containing application-specific data defined in properties 314B for the Microsoft Word application is generated whenever the user creates a new document using the Microsoft Word application. In one embodiment, at processing block 512, the newly generated extension 140 is attached to the item 150 that describes the object using a tag 202A, 202B. As illustrated in FIG. 5, the process of generating an extension 140 and attaching it to the corresponding item 150 describing the object is repeated as needed throughout the object's life cycle.

Figure 6:
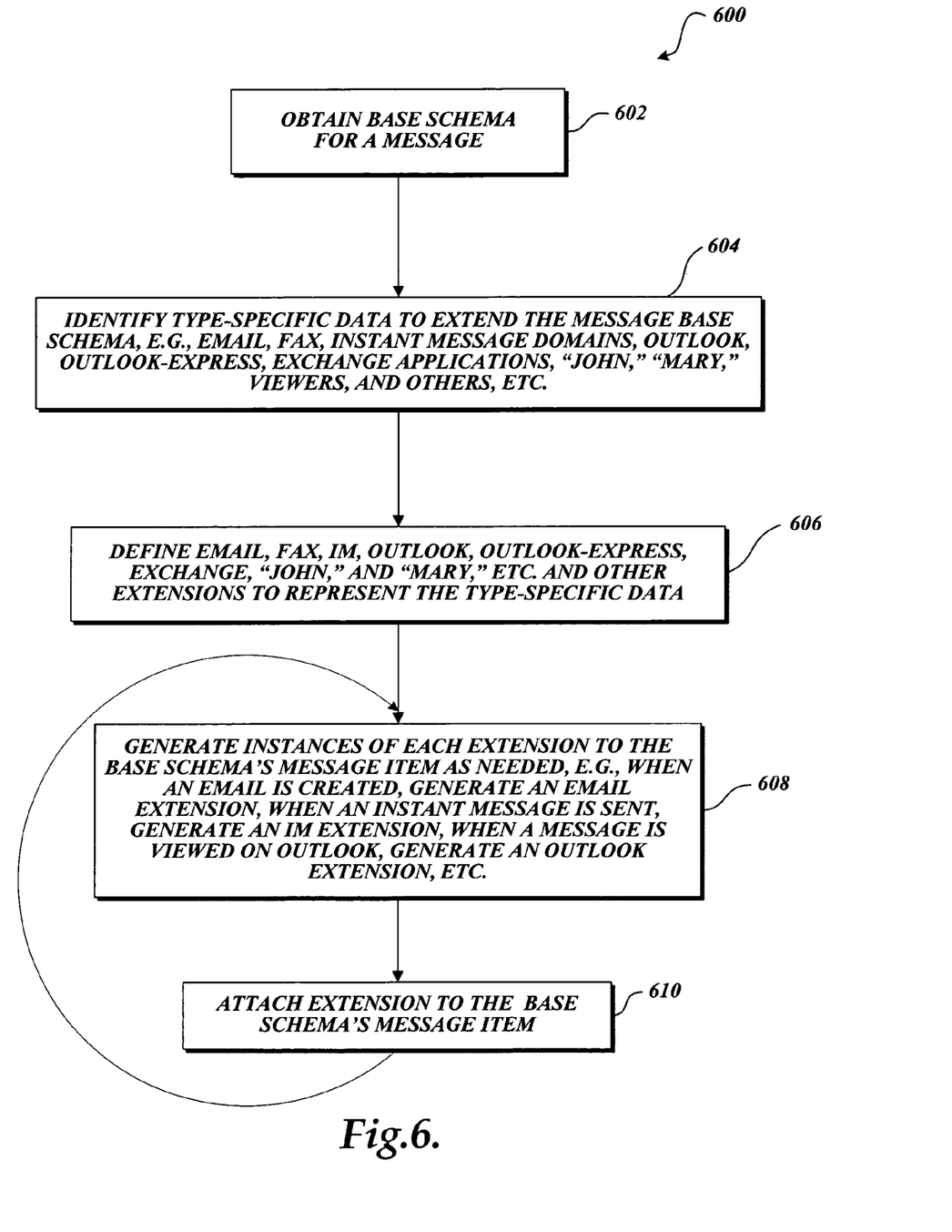
FIG. 6 is a flow diagram illustrating exemplary logic performed by a general-purpose computer system for extending a pre-defined base schema for message data to represent multiple types of message data, formed in accordance with the present invention.

FIG. 6 is a flow diagram illustrating exemplary logic 600 performed by a general-purpose computer system for extending a pre-defined message base schema to describe multiple types of message objects, formed in accordance with the present invention. The logic 600 begins in processing block 602 with creating or obtaining a base schema for a message, such as the Message Base Schema 302 provided as part of the WinFS data storage subsystem of the Windows operating system, as previously discussed with reference to FIG. 3. A message base schema is a schematized data model comprised of at least one item 150 that contains data that describes those properties 130 of an object that most or all types of the object have in common. In the illustrated example, the message schema 302 is comprised of, among others, a message item 306 that defines common message properties 308, such as the sender and recipient of the message.

To extend the message schema 302, the user continues at process block 604 to identify the type-specific data with which the user wishes to extend the message base schema 302, including, among others, type-specific data related to email, fax, and instant messaging domains, Outlook, Outlook-Express, and Exchange applications, and/or particular users. Once the analysis is complete, at process block 606, the user creates one or more message extensions 312 to the message item type 306 to contain the type-specific messaging data identified in process block 604, including defining the type-specific properties 314 to hold the type-specific data. For example, in a typical messaging environment, the user will create a fax message extension 312A to hold fax-specific data, and an email message extension 312B to hold email-specific data.

During operation, processing continues at process block 608, where the extensions 312A, 312B are generated to hold the type-specific data in properties 314 whenever a facsimile transmission is initiated or an email is sent. For example, an email extension 312B is generated when an email message object is created, and a fax extension 312A is generated when a fax message object is created, and so forth. In one embodiment, at processing block 610, the newly generated extension 312 is attached to the corresponding message item 306 using a tag 310. As illustrated in FIG. 6, the process of generating a message extension 312 and attaching it to the corresponding message item 306 is repeated as needed throughout the life cycle of the message.

As a result of the foregoing, the user can advantageously create an unlimited number of extensions 140 to a particular item 150 in a standardized schema that is based on a schematized data model having a single inheritance hierarchy. The use of extensions in this manner supports data multityping without impacting the behavior and functionality of the items in the standardized schema, and without increasing the data storage requirements of, or introducing undesirable complexity and ambiguity in, the data model upon which the standardized schema is based.

While the presently preferred embodiments of the invention have been illustrated and described, it will be appreciated that various changes may be made therein without departing from the spirit and scope of the invention.

The invention claimed is:

1. A method for multityping data in a particular file and operating system using a schematized data model having a single inheritance hierarchy, the method comprising:
    defining a first abstract data construct in a schematized data model to contain data that most types of an object have in common;
    defining a second abstract data construct to contain data that is specific to a particular type of the object;
    defining a type of the first abstract data construct to describe the object's common data;
    defining a first type of the second abstract data construct to describe data that is specific to one particular type of the object;
    attaching an instance of the first type of the second abstract data construct to an instance of the first abstract data construct type without altering a behavior of the first abstract data construct; and
    storing on the particular file and operating system information about the attachment between the instance of the first type of the second abstract data construct and the instance of the first abstract data construct type,
    wherein the first abstract data construct is an item defined in the base schema of in the particular file and operating system, and the second abstract data construct is an extension in the particular file and operating system,
    wherein the particular file and operating system is a Windows File System.

2. The method of claim 1, wherein defining the type of the first abstract data construct to describe the object's common data includes defining at least one property to hold the data in an item type, and an instance of the item type includes assigning to the property a value of the object's common data.

3. The method of claim 1, wherein defining the first type of the second abstract data construct to describe one particular type of the object includes defining at least one property to hold the data in an extension type, and an instance of the extension type includes assigning to the property a value of data that is specific to one particular type of the object.

4. The method of claim 1, further comprising defining a second type of the second abstract data construct to describe another particular type of the object, attaching an instance of the second type of the second abstract data construct to an instance of the first abstract data construct type without altering the behavior of the first abstract data construct, and storing information about the attachment between the instance of the second type of the second abstract data construct and the instance of the first abstract data construct type.

5. The method of claim 1, further comprising defining a third type of the second abstract data construct to describe a subtype of the one particular type of the object, attaching an instance of the third type of the second abstract data construct to the instance of the second type of the second abstract data construct without altering the behavior of the first abstract data construct, and storing information about the attachment between the instance of the third type of the second abstract data construct and the instance of the second type of the second abstract data construct.

6. A method for multityping data in a particular file and operating system using a schematized data model having a single inheritance hierarchy, the method comprising:
    defining a first abstract data construct in a schematized data model to contain data that most types of an object have in common;
    defining a second abstract data construct to contain data that is specific to a particular type of the object;
    defining a type of the first abstract data construct to describe the object's common data;
    defining a first type of the second abstract data construct to describe data that is specific to one particular type of the object;
    attaching an instance of the first type of the second abstract data construct to an instance of the first abstract data construct type without altering a behavior of the first abstract data construct; and
    storing on the particular file and operating system information about the attachment between the instance of the First type of the second abstract data construct and an instance of the first abstract data construct type,
    wherein the schematized data model is the data model used in the particular file and operating system;
    wherein the particular file and operating system is a Windows File System.

7. A method for multityping data in a particular file and operating system using a schematized data model having a single inheritance hicrarchy, the method comprising:
    defining a first abstract data construct in a schematized data model to contain data that most types of an object have in common;
    defining a second abstract data construct to contain data that is specific to a particular type of the object;
    defining a type of the first abstract data construct to describe the object's common data;
    defining a first type of the second abstract data construct to describe data that is specific to one particular type of the object;
    attaching an instance of the first type of the second abstract data construct to an instance of the first abstract data construct type without altering a behavior of the first abstract data construct;
    storing on the particular file and operating system information about the attachment between the instance of the first type of the second abstract data construct and an instance of the first abstract data construct type;
    wherein the schematized data model to represent data that most types of an object have in common is the Windows Message Base Schema to represent data that most types of messages have in common; and
    wherein the message base schema is defined for the particular file and operating system;
    wherein the particular file and operating system is a Windows File System.

8. A system for multityping data in a Windows File System using a schematized data model, the system comprising:
    (a) processor; and (b) a computer-accessible storage medium storing computer-executable components including computer-executable instructions to be executed by the processor, the computer-executable components comprising:

(i) a common type component including instructions which, when executed by the processor, cause an item containing data that most types of an object that the item describes have in common to be stored;

(ii) a specific type component including instructions which, when executed by the processor, cause an extension containing data that a specific type of the object that the item describes have in common to be stored; and (iii) an item processing component including instructions which, when executed by the processor, cause a process to be operated on the item and the extension in response to an action on the object, including attaching the extension to the item, wherein the processing of the item is unaffected by the attached extension, and wherein the item that describes the object is defined in a base schema provided by the Windows File System.

9. A computer-accessible storage medium having computer-executable instructions for multityping data in a particular file and operating system using a schematized data model, the instructions comprising:

obtain an item defined in a schematized data model that contains data that most types of an object have in common;

define an extension to the item that contains data that is specific to a particular type of the object;

generate an instance of the item to describe the object;

generate an instance of the extension to describe the particular type of the object;

tag the instance of the extension to the instance of the item in a manner that does not alter the item's functionality; and store on the particular file and operating system information about the generated instances and tagging relationship among instances, wherein the item is defined in a base schema provided in a Windows File System (WinFS).

10. A computer-accessible storage medium having computer-executable instructions for multityping data in a particular file an operating system, the instructions comprising:

obtain an item defined in a schematized data model that contains data that most types of an object have in common;

define an extension to the item that contains data that is specific to a particular type of the object;

generate an instance of the item to describe the object;

generate an instance of the extension to describe the particular type of the object;

tag the instance of the extension to the instance of the item in a manner that does not alter the item's functionality; and store on the particular file and operating system information about the generated instances and the tagged instance of the extension, wherein the item in the schematized data model is a message item obtained from a Windows Message Base Schema where the message item contains data that most types of messages have in common.

11. The computer-accessible storage medium of claim 10, wherein the extension is a message extension based on an extension construct obtained from a Windows File System.

12. The computer-accessible storage medium of claim 11, wherein the message extension contains data that is specific to a particular domain of messages, wherein the domain is one of an email, fax, voice, and instant message domain.

13. The computer-accessible storage medium of claim 11, wherein the message extension contains data that is specific to a particular application with which the messages are associated, wherein the application includes at least one of an email, word processing, and communications transport application.

14. The computer-accessible storage medium of claim 11, wherein the message extension contains data that is specific to a particular user with which the messages are associated, wherein the user is an individual having access to the messages.

* * * * *